Feb. 27, 1934.   C. LITTLEFIELD   1,948,622
SLICING MACHINE
Filed Sept. 18, 1929   7 Sheets-Sheet 1

Fig. 1.

INVENTOR
Carl Littlefield
BY Chappell Earl
ATTORNEYS

Fig. 3

Patented Feb. 27, 1934

1,948,622

UNITED STATES PATENT OFFICE 1,948,622

SLICING MACHINE

Carl Littlefield, Battle Creek, Mich., assignor to Battle Creek Bread Wrapping Machine Company, Battle Creek, Mich.

Application September 18, 1929
Serial No. 393,339

41 Claims. (Cl. 146—153)

The main objects of this invention are:

First, to provide a slicing machine which is well adapted for the slicing of fresh bread which is of large capacity and slices a loaf of bread or the like without mutilation, delivering the slices in side by side relation.

Second, to provide an improved slicing machine which operates quietly and with little vibration, the slicing means being effectively balanced.

Third, to provide in a slicing machine an improved mounting for the blades.

Fourth, to provide a slicing means in which danger to the operator is minimized.

Fifth, to provide a slicing machine in which the texture of the material sliced is not broken down or materially disarranged.

Objects relating to details and economies of my invention will appear from the description to follow. The invention is defined and pointed out in the claims.

A structure which is a preferred embodiment of my invention is illustrated in the accompanying drawings, in which:

Fig. 5 is a fragmentary vertical longitudinal section.

Fig. 5—A is an enlarged fragmentary vertical section illustrating the movement of the slicing blades.

Fig. 6 is a fragmentary vertical section through the cutter illustrating details of the blade mounting.

Fig. 6—A is an enlarged section through one of the blades on line 6—A——6—A of Fig. 6.

For convenience, I refer to the article to be sliced as a loaf of bread although it will be understood that the machine may be readily adapted for slicing other articles.

The machine illustrated is particularly designed as a bread slicing machine. The frame is of such character to support the various parts and in general comprises side members 1 and front and rear cross members 2 and 3, these being preferably castings as illustrated.

The loaves to be sliced are carried to the slicing mechanism by means of a conveyor consisting of conveyor chains 4 having flights 5 thereon adapted to push the loaves along on the way 6, the way having longitudinal slots therein through which the flights project on their work stroke.

At each side of the way is a feed table 7 so that the loaves may be placed on the way between the flights from either side of the machine.

At each side of the way are guide and positioning bars 8 and 9, the bar 8 being extended rearwardly to serve as a stop bar when the loaves are fed from one side of the machine, the bars being reversed when it is intended to feed the loaves from the opposite side of the machine.

Figure 1:
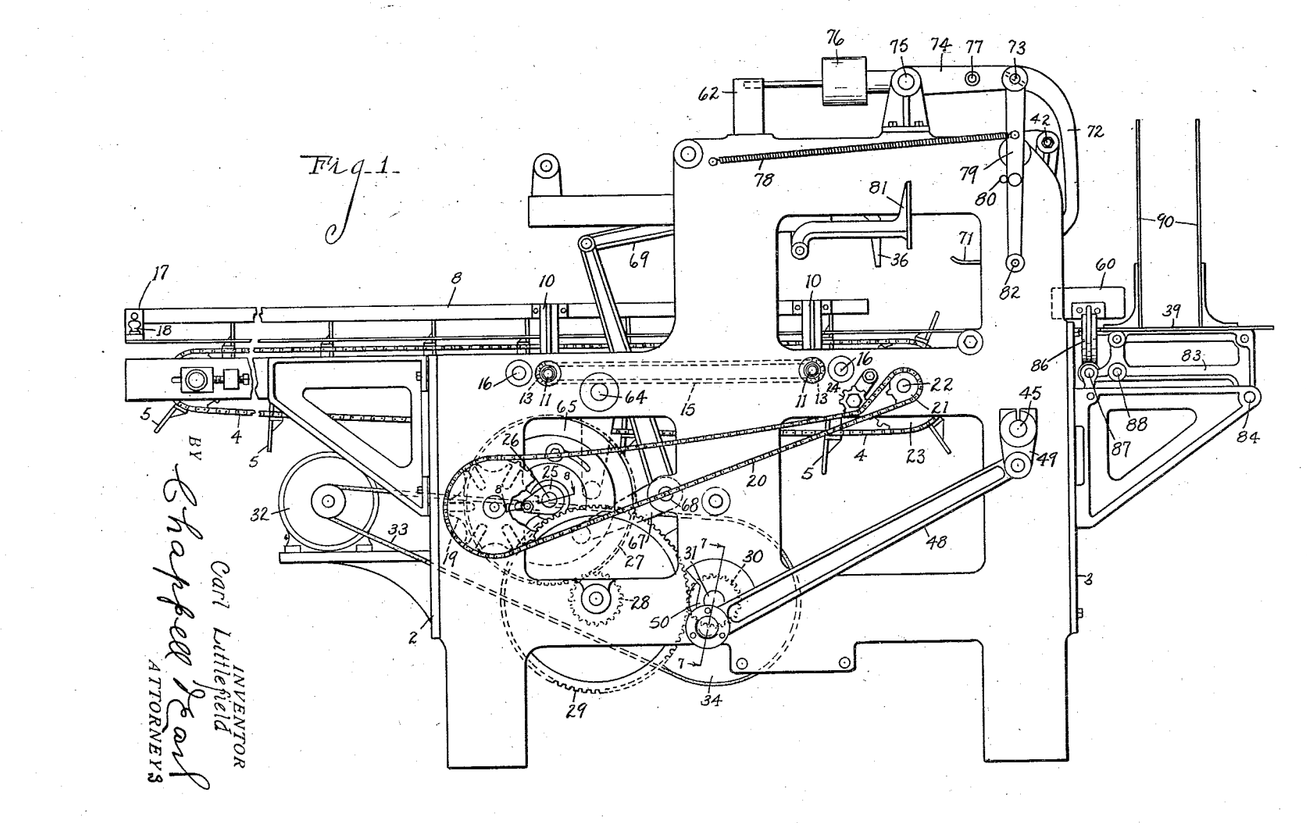
Fig. 1 is a side elevation of my improved slicing machine.
Figure 2:
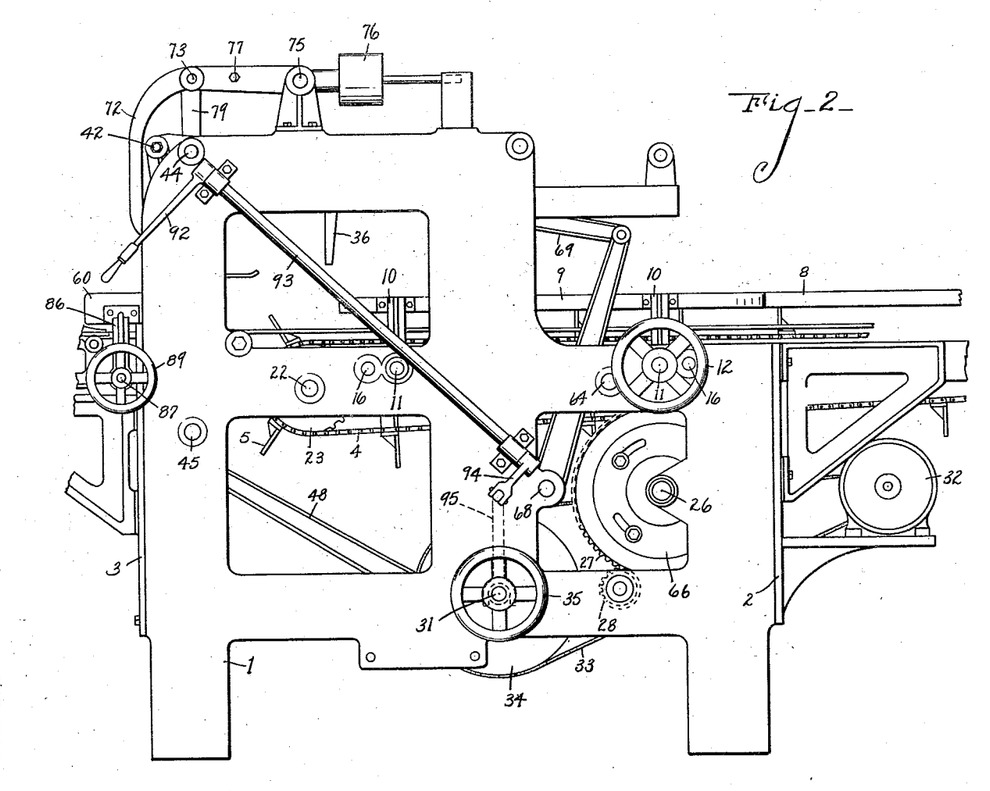
Fig. 2 is a fragmentary elevation from the side opposite that shown in Fig. 1.

These guide bars are supported by brackets 10, 10 which are slidably mounted on screws 11, one of which is provided with a hand wheel 12. These screws have sprocket wheels 13 thereon connected by a sprocket chain 15—see the dotted line in Fig. 1, so that they may be simultaneously adjusted from the hand wheel 12. The brackets 10 are further supported by the rods 16.

The rear end of the guide bar 8 is supported by a bracket 17 longitudinally slotted to receive the set screw 18, this set screw being tightened after the bars are adjusted through their adjusting screws to hold the rear end of the bar 8 in position.

The conveyor is driven with a step by step movement, the Geneva gear 19 being connected by a sprocket chain 20 to the sprocket wheel 21 on the shaft 22 carrying the driving sprockets 23 for the conveyor chains. A tightener designated by the numeral 24 is provided for the chain 20.

The driving crank arm 25 for the Geneva gear is mounted on the cam shaft 26, this cam shaft being connected by a train of gears comprising the gears 27, 28, 29 and 30 (see Fig. 1) to the driving shaft 31, the gear 30 being on the shaft 31.

In the embodiment illustrated the machine is driven by a motor 32 connected by a belt 33 to the pulley 34 on the shaft 31. This shaft 31 also has a hand wheel 35 by means of which the machine may be manipulated for adjustment or other purposes as may be required.

The loaves are delivered by this conveyor described into position to be engaged by the feed plunger or pusher 36 which feeds the loaves along the slicing table 37, past the slicing blades 38 on to the receiving table 39, the slicing table being, in the embodiment illustrated, mounted upon the frame carrying the receiving table, as will hereinafter be described.

There are two sets of blades 38, the blades of the sets being disposed in spaced crossed relation.

The blade crossheads 40 and 41 are pivotally mounted at 42 on the rockers 43 carried by rockshafts 44 and 45. The crossheads 40 and 41 are rigidly connected by end pieces 46, the crossheads and end pieces, in the embodiment illustrated, being formed integrally, the end pieces 46 having ears 47 engaging the pivots on the rockers.

The lower rockshaft 45 is driven through the pitman 48 connected to the arm 49 on the rockshaft 45, the pitman being driven from the crank 50 on the main driving shaft 31. With this arrangement, the sets of blades are oscillated in opposite directions. The blades are preferably toothed as illustrated.

To provide a convenient means for mounting the blades and to secure the desired and uniform tension thereon, they are connected to the crossheads by the couplings 51 and 52 (see Fig. 6), the crosshead 40 having bores 53 to receive the coupling 51, the bores being countersunk to receive heads 54 on the ends of the couplings.

Figures 5, 6, 6A:
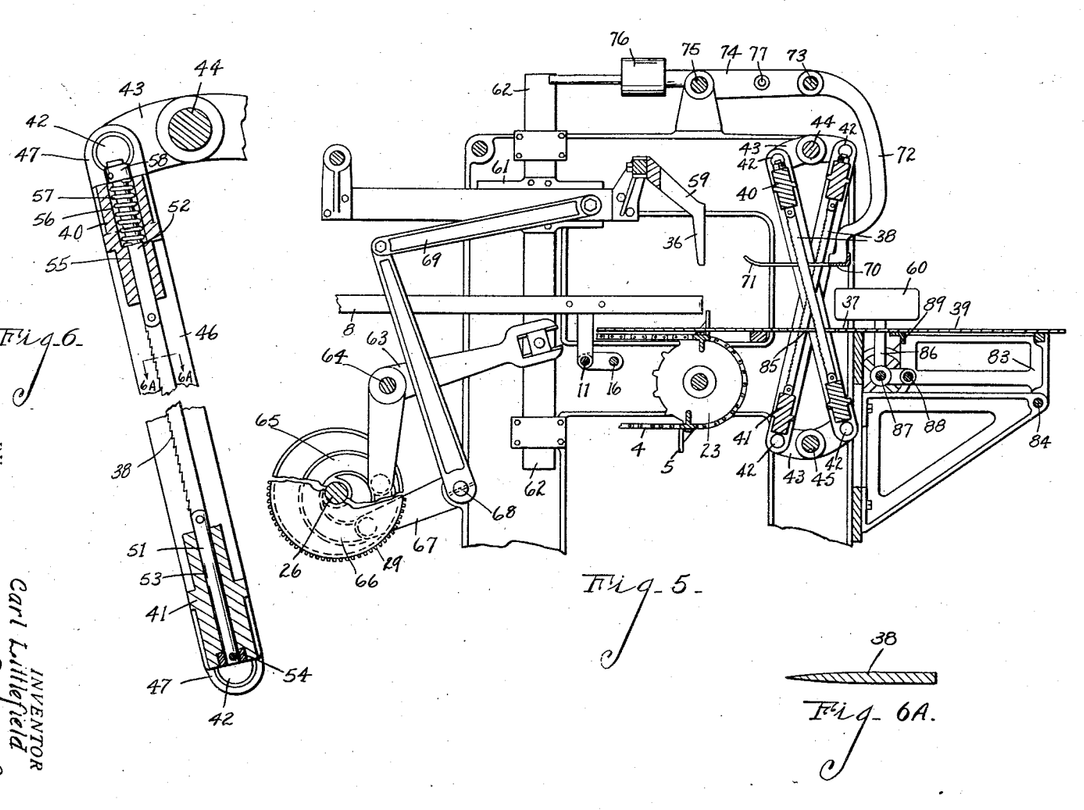

The bores 55 in the crosshead 41 are shouldered to provide chambers 56 adapted to receive the coiled springs 57, these coiled springs being arranged on the coupling members to engage the thrust collars 58 thereon.

By this means the blades are all held under the desired tension and the crossheads are not likely to be distorted or sprung owing to excessive stresses as might be the case where the blades are tensioned by screw means.

The feed plunger 36 has a plurality of fingers 59 of such width as to permit them to pass between the blades, the outer ends of the fingers being vertical to engage the sides of the loaf and carry it past the blades, delivering it onto the receiving table 39 between the holders 60. The plunger 36 is slidably mounted in a way 61 carried by the vertically reciprocating carriage 62 so that the plunger has a compound movement; that is, it moves vertically as well as horizontally, traveling in a somewhat elliptical path or orbit, so that on its rearward stroke it is lifted over the forward loaf, lowered into engagement with the same and moves forward, pushing the loaf past the blades, as stated, the fingers 59 passing between the blades so that the loaf is supported throughout during this slicing operation, and after it is completely sliced, the individual slices are engaged by the fingers.

The carriage 62 is reciprocated by means of the bell crank lever 63 pivoted at 64 to coact with the cam 65 on the cam shaft 26. The plunger is reciprocated in proper synchronism with this reciprocation of the carriage by means of the cam 66 acting upon the bell crank lever 67 pivoted at 68 and connected by the link 69 to the plunger, various details of these parts being shown in Figs. 1, 5 and 8.

As the loaf is brought into operative relation to the knives, it passes under the holder 70 slotted to provide a plurality of fingers 71 which project between the blades so that the loaf is held between the slicing table, the holder 70 and the pusher while subjected to the action of the knives.

To permit this engagement throughout the slicing operation, the holder 70 is mounted on an arm 72 pivoted at 73 on a bracket 74 which is also pivoted at 75 and provided with a counterweight 76. The holder may be swung to inoperative position as shown in Fig. 3 in which position it is supported by a stop 77 on the bracket 74.

The holder is held yieldingly in position by means of the coiled spring 78 engaging the arm 79 on the pivot rod 73, a stop 80 being provided for this arm and limiting the forward movement of the holder.

To move the holder in synchronism with the pusher, the pusher is provided with a tappet 81 adapted to engage the pin 82 on the lower end of the arm 79 on the forward stroke of the plunger and moving the holder along with the loaf during the latter portion of the slicing operation and permitting the complete delivery thereof into the holders or supports 60.

Figure 3:
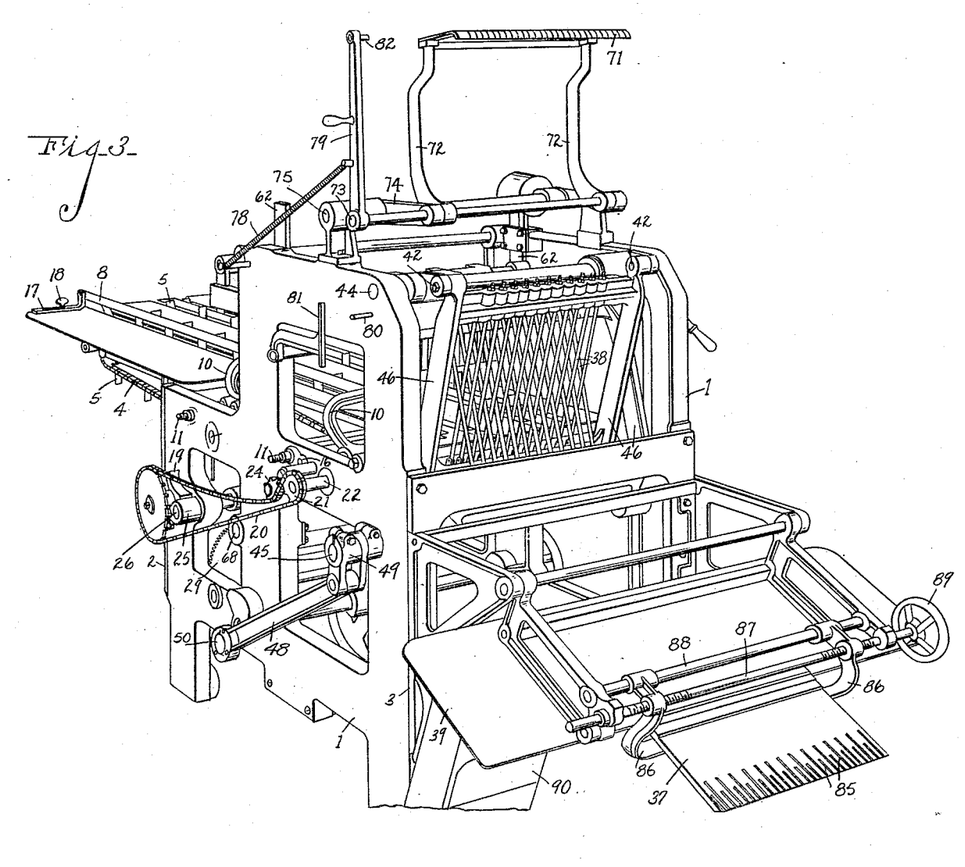
Fig. 3 is a rear perspective view, considering the machine from the standpoint of the path of travel of the articles therethrough, the receiving table and the loaf holder being swung to inoperative position to more clearly disclose the other features.
Figure 4:
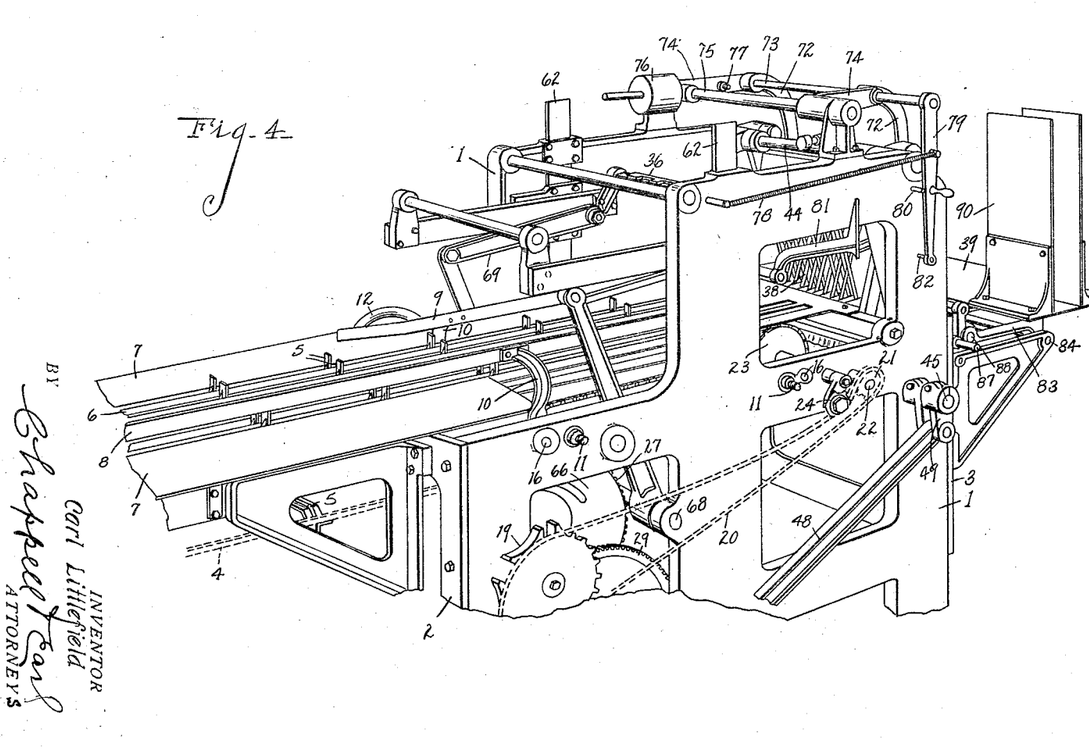
Fig. 4 is a fragmentary front perspective view.

To afford complete access to the cutters, the bed or supporting frame 83 of the receiving table 39 is pivoted at 84 so that it may be swung downwardly to the position shown in Fig. 3 carrying with it the slicing table 37 which has slots 85 therein to receive the blades. The end holders 60 are also carried by this frame or bed, being adjustably mounted thereon, their supporting brackets 86 being carried by the reversely threaded screw 87 and the rod 88 mounted on the frame 83, the adjusting screw 87 being provided with a hand wheel 89, so that the holders are simultaneously adjusted by the turning of this screw.

In the embodiment illustrated, the table is provided with a hopper or holder 90 having trays or boxes into which the sliced loaves may be placed prior to wrapping the same should that be desired, the sliced loaves being lifted from between the holders 60 as delivered thereto by the plunger.

Figures 7, 8:
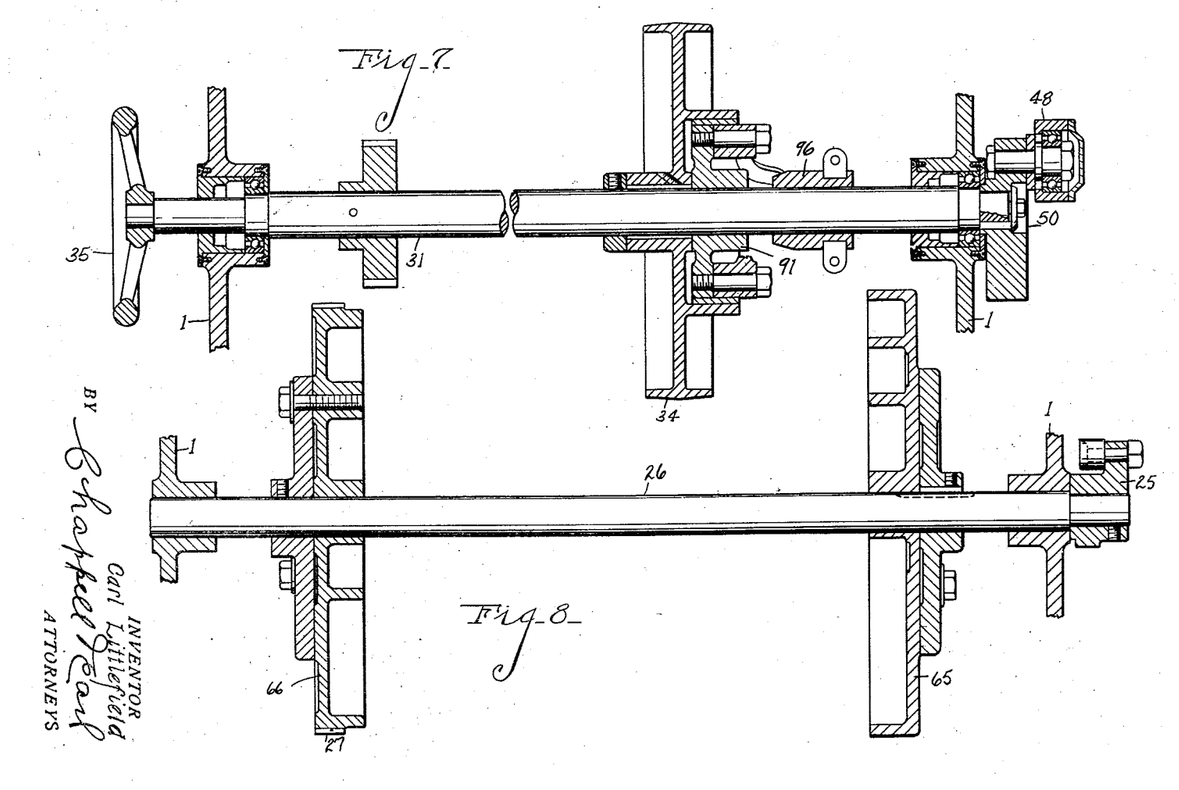
Fig. 7 is a detail view partially in section on line 7—7 of Fig. 1 showing details of the drive mechanism.
Fig. 8 is a detail view partially in section on line 8—8 of Fig. 1 showing further details of the drive mechanism.

The machine is controlled by a clutch designated generally by the numeral 91 coacting with the pulley 34 (see Fig. 7). The clutch lever 92 is mounted on the rockshaft 93 having an arm 94 thereon connected by the link 95 to the clutch actuating collar 96.

Figure 5A:
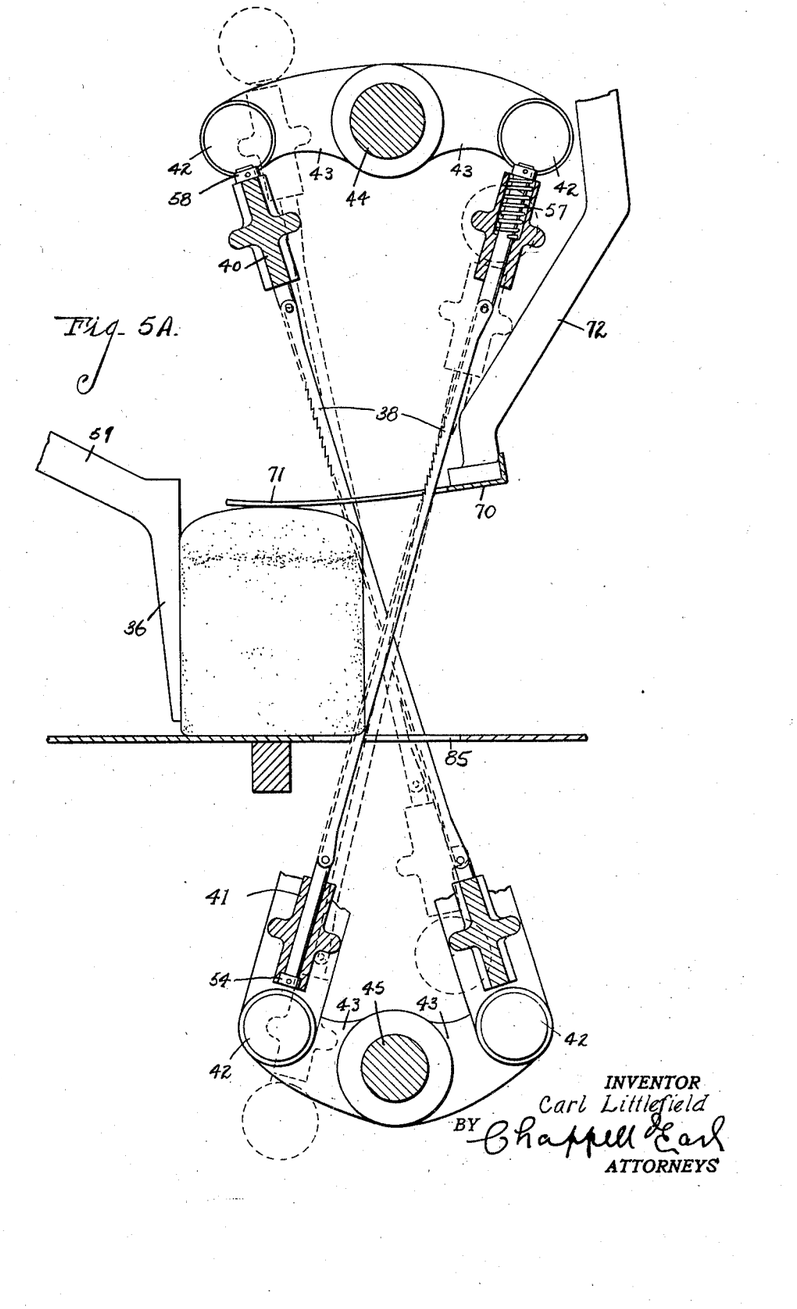

It will be noted that the blades are toothed, but that the teeth have no set, the blades being sharpened on both sides (see Figs. 6 and 6—A). The blades have a combined reciprocating and longitudinal rocking or oscillating movement as they are reciprocated as is illustrated in Fig. 5—A. The crossed relation of the sets of blades and this combined reciprocating and tilting movement is highly effective in the slicing of material such as bread which usually has quite a hard crust and soft interior. The reciprocating and rocking or oscillating movement causes the blade to cut the crust and soft material with equal facility and without crushing or breaking down the texture of the bread. Further, by arranging the blades in crossed relation the corners of the loaf are first presented so that entering kerfs are made without undue pressure on the bread.

My improved slicing machine is of very large capacity and is effective and will operate on even very soft loaves without crushing or distorting. Further, the structure may be operated with little danger to the operators and the parts are so arranged that the operating stresses are minimized.

I have illustrated and described my improvements in an embodiment which I have found highly satisfactory. I have not attempted to illustrate and describe various modifications or adaptations as I believe this disclosure will enable those skilled in the art to embody or adapt the same as may be desired.

Having thus described my invention, what I claim as new and desire to secure by Letters Patent, is:

1. In a slicing machine, the combination of a slotted slicing table, a delivery table at the rear of said slicing table, coacting pairs of crossheads rigidly connected by end members disposed in crossed relation, rockshafts provided with arms on which said crossheads are pivotally mounted in counterbalancing relation, blades mounted on said crossheads in crossed sets and disposed through said slots in said slicing table, a feed plunger provided with fingers spaced to pass between the blades and having vertical loaf engaging tips, a top holder slotted to receive said blades and pivotally mounted to swing rearwardly, a tappet on said plunger adapted to engage said top holder toward the rear end of the plunger stroke, and spaced supports on said delivery table to which the loaf is delivered by said plunger.

2. In a slicing machine, the combination of a slotted slicing table, coacting pairs of crossheads rigidly connected by end members disposed in crossed relation, rockshafts provided with arms on which said crossheads are pivotally mounted in counterbalancing relation, blades mounted on said crossheads in crossed sets and disposed through said slots in said slicing table, a feed plunger provided with fingers spaced to pass between the blades and having vertical loaf engaging tips, a top holder slotted to receive said blades and pivotally mounted to swing rearwardly, and a tappet on said plunger adapted to engage said top holder toward the rear end of the plunger stroke.

3. In a slicing machine, the combination of a slotted slicing table, a delivery table at the rear of said slicing table, coacting pairs of crossheads rigidly connected by end members disposed in crossed relation, rockshafts provided with arms on which said crossheads are pivotally mounted in counterbalancing relation, blades mounted on said crossheads in crossed sets and disposed through said slots in said slicing table, a feed plunger provided with fingers spaced to pass between the blades, a top holder slotted to receive said blades, and spaced supports on said delivery table to which the loaf is delivered by said plunger.

4. In a slicing machine, the combination of a slotted slicing table, coacting pairs of crossheads rigidly connected by end members disposed in crossed relation, rockshafts provided with arms on which said crossheads are pivotally mounted in counterbalancing relation, blades mounted on said crossheads in crossed sets and disposed through said slots in said slicing table, a feed plunger provided with fingers spaced to pass between the blades, and a top holder slotted to receive said blades.

5. In a slicing machine, the combination of a slotted slicing table, coacting pairs of crossheads rigidly connected by end members disposed in crossed relation, rockshafts provided with arms on which said crossheads are pivotally mounted in counterbalancing relation, blades mounted on said crossheads in crossed sets and disposed through said slots in said slicing table, and means for feeding an article to be sliced across said blades.

6. In a slicing machine, the combination of a slicing table, a delivery table at the rear of said slicing table, coacting pairs of crossheads, rockshafts provided with rocker arms on which said crossheads are pivotally mounted in counterbalancing relation, blades mounted on said crossheads in crossed sets, a feed plunger provided with fingers spaced to pass between the blades, a top holder having fingers disposed between said blades and pivotally mounted to swing rearwardly, a tappet on said plunger adapted to engage said top holder toward the rear end of the plunger stroke, and spaced supports on said delivery table to which the loaf is delivered by said plunger.

7. In a slicing machine, the combination of a slicing table, a delivery table at the rear of said slicing table, coacting pairs of crossheads, rockshafts provided with rocker arms on which said crossheads are pivotally mounted in counterbalancing relation, blades mounted on said crossheads in crossed sets, a feed plunger provided with fingers spaced to pass between the blades, a top holder having fingers disposed between said blades, and spaced supports on said delivery table to which the loaf is delivered by said plunger.

8. In a slicing machine, the combination of a slicing table, coacting pairs of crossheads, rockshafts provided with rocker arms on which said crossheads are pivotally mounted in counterbalancing relation, blades mounted on said crossheads in crossed sets, a feed plunger provided with fingers spaced to pass between the blades, a top holder having fingers disposed between said blades and pivotally mounted to swing rearwardly, and a tappet on said plunger adapted to engage said top holder toward the rear end of the plunger stroke.

9. In a slicing machine, the combination of a slicing table, coacting pairs of crossheads, rockshafts provided with rocker arms on which said crossheads are pivotally mounted in counterbalancing relation, blades mounted on said crossheads in crossed sets, a feed plunger provided with fingers spaced to pass between the blades, and a top holder having fingers disposed between said blades.

10. In a slicing machine, the combination of a slicing table, a delivery table at the rear of said slicing table, coacting pairs of crossheads, rockshafts provided with rocker arms on which said crossheads are pivotally mounted in counterbalancing relation, blades mounted on said crossheads in crossed sets, and means for feeding an article to be sliced across said blades.

11. In a slicing machine, the combination of a slicing table, a delivery table at the rear of said slicing table, coacting pairs of oscillating crossheads, blades mounted on said crossheads in crossed sets, a feed plunger provided with fingers spaced to pass between the blades and having vertical loaf engaging tips, a top holder slotted to receive said blades and pivotally mounted to swing rearwardly, a tappet on said plunger adapted to engage said top holder toward the rear end of the plunger stroke, and spaced supports on said delivery table to which the loaf is delivered by said plunger.

12. In a slicing machine, the combination of a slicing table, coacting pairs of oscillating crossheads, blades mounted on said crossheads in crossed sets, a feed plunger provided with fingers spaced to pass between the blades and having vertical loaf engaging tips, a top holder slotted to receive said blades and pivotally mounted to swing rearwardly, and a tappet on said plunger adapted to engage said top holder toward the rear end of the plunger stroke.

13. In a slicing machine, the combination of a slicing table, a delivery table at the rear of said slicing table, coacting pairs of oscillating crossheads, blades mounted on said crossheads in crossed sets, a feed plunger provided with fingers spaced to pass between the blades, a top holder slotted to receive said blades, and spaced supports on said delivery table to which the loaf is delivered by said plunger.

14. In a slicing machine, the combination of a slicing table, coacting pairs of oscillating crossheads, blades mounted on said crossheads in crossed sets, a feed plunger provided with fingers spaced to pass between the blades, and a top holder slotted to receive said blades.

15. In a slicing machine, the combination of a slicing table, sets of reciprocatingly mounted blades disposed through said slicing table in crossed relation, a top holder provided with fingers disposed between said blades, the crossing points of the blades being between the top holder and the slicing table, a reciprocating feed plunger provided with fingers adapted to pass between said blades and having vertically disposed tips, and opposed holders between which the sliced article is delivered by said plunger.

16. In a slicing machine, the combination of a slicing table, sets of reciprocatingly mounted blades disposed through said slicing table in crossed relation, a top holder provided with fingers disposed between said blades, the crossing points of the blades being between the top holder and the slicing table, and a reciprocating feed plunger provided with fingers adapted to pass between said blades.

17. In a slicing machine, the combination of a feed conveyor comprising a conveyor way and flights driven with a step by step movement for propelling an article along said way, a slicing table disposed at the rear of and in the plane of said way, a slicing means, a vertically reciprocating feed plunger carriage provided with a horizontally disposed feed plunger way, a feed plunger reciprocating in said way on said feed carriage in parallel relation to the plane of the conveyor, and means for actuating said carriage and reciprocating said plunger in timed relation with each other and with the conveyor flights whereby the articles to be sliced are successively engaged by the plunger and fed to said slicing means.

18. In a slicing machine, the combination of a slicing table, a slicing means comprising a plurality of spaced blades reciprocating through said table, a pivotally mounted top holder provided with fingers extending between said blades, a vertically reciprocating feed plunger carriage provided with a horizontally disposed feed plunger way, a feed plunger reciprocatingly mounted in said way and provided with fingers adapted to pass between said blades, means for actuating said carriage and reciprocating said plunger in timed relation, and means for successively feeding articles into position to be engaged by said plunger on its forward stroke.

19. In a slicing machine, the combination of a slicing table, a slicing means comprising a plurality of spaced blades reciprocating through said table, a vertically reciprocating feed plunger carriage provided with a horizontally disposed feed plunger way, a feed plunger reciprocatingly mounted in said way and provided with fingers adapted to pass between said blades, means for actuating said carriage and reciprocating said plunger in timed relation, and means for successively feeding articles into position to be engaged by said plunger on its forward stroke.

20. In a slicing machine, the combination of a slicing table, a slicing means comprising a plurality of spaced blades reciprocating through said table, a vertically reciprocating feed plunger carriage provided with a horizontally disposed feed plunger way, a feed plunger reciprocatingly mounted in said way and provided with fingers adapted to pass between said blades, and means for actuating said carriage and reciprocating said plunger in timed relation.

21. The combination of a feed conveyor comprising a conveyor way and flights driven with a step by step movement for propelling an article along said way, a vertically reciprocating feed plunger carriage provided with a horizontally disposed feed plunger way, a feed plunger reciprocating in said way on said feed carriage in parallel relation to the plane of the conveyor, and means for actuating said carriage and reciprocating said plunger in timed relation with each other and with the conveyor flights.

22. The combination of a feed conveyor comprising a conveyor way and coacting flights driven with a step by step movement, a feed plunger carriage mounted to reciprocate in a plane transverse to the plane of the conveyor way, a feed plunger mounted on said carriage to reciprocate relative to the carriage in a plane parallel to said way, and means for actuating said carriage plunger and flights in timed relation.

23. The combination with a feed conveyor, of a feed plunger carriage mounted in a plane above said feed conveyor to reciprocate in a vertical plane, a feed plunger mounted to reciprocate on and relative to said carriage in a plane parallel to the conveyor, and means for actuating said carriage and reciprocating said plunger on said carriage in timed relation.

24. In a slicing machine, the combination with the slicing table, of a plurality of slicing blades, a feed plunger provided with fingers adapted to pass between said blades, a holder provided with fingers adapted to pass between said blades, a pivotally mounted supporting bracket provided with a counterweight, and a supporting arm for said top holder pivotally mounted on said bracket, the pivot for said arm being above the said blades, said plunger being adapted to swing said holder on its pivot during the latter part of the stroke of the plunger.

25. In a slicing machine, the combination of a slicing means comprising a plurality of blades, a receiving table provided with a bed pivotally mounted at its outer side, a slicing table carried by said bed and slotted to receive said blades, a pair of adjustably mounted holders, and a right and left threaded screw coacting with said holders whereby they may be simultaneously adjusted to and from each other.

26. In a machine of the class described, the combination of a pair of crossheads having aligned bores therein, one of the bores being shouldered, a plurality of blades, rod-like coupling members connected to the ends of said blades and arranged in said bores, the coupling members arranged in the shouldered bores being provided with a thrust collar, and coiled springs arranged in said shouldered bores and coacting with said thrust collars for supporting said blades under longitudinal tension.

27. In a machine of the class described, the combination of a pair of crossheads, one of said crossheads having shouldered bores therein, a plurality of blades connected at one end to one of said crossheads, coupling members connected to the other ends of said blades and arranged in said bores, said coupling members being provided with thrust collars, and coiled springs arranged in said bores and coacting with said thrust collars for supporting said blades under longitudinal tension.

28. In a slicing machine, the combination of a pair of crossheads rigidly connected in spaced relation, said crossheads having aligned bores therein, a plurality of blades, coupling members for said blades arranged in said bores, and coiled springs supported by one of the crossheads and acting on the coupling members mounted thereon for constantly tensioning said blades longitudinally.

29. In a slicing machine, the combination of a feed table, a pair of rockshafts disposed one above and the other below said table, rocker arms on said rockshafts, sets of blades disposed in crossed relation, crossheads for said sets of blades mounted on oppositely projecting rocker arms on said rockshafts, and a feed means for advancing the article to be sliced to said blades.

30. In a slicing machine, the combination of a pair of rockshafts, rocker arms on said rockshafts, sets of blades disposed in crossed relation, crossheads for said sets of blades mounted on oppositely projecting rocker arms on said rockshafts, and a feed means for advancing the article to be sliced centrally to said blades.

31. In a slicing machine, the combination of a pair of rockshafts, rocker arms on said rockshafts, sets of blades disposed in crossed relation, and crossheads for said sets of blades mounted on oppositely projecting rocker arms on said rockshafts.

32. The combination in a slicing machine, of sets of blades disposed in crossed relation, means for simultaneously reciprocating and rocking said blades, and means for feeding the article to be sliced to said blades with the center of the article in approximately the longitudinal center of the blades.

33. The combination in a slicing machine, of sets of blades disposed in crossed relation, and means for simultaneously reciprocating and rocking said blades.

34. The combination in a slicing machine, of an article feed means, sets of toothed blades disposed in crossed relation, the teeth being sharpened on both sides and being without set, and means for simultaneously reciprocating and rocking said blades.

35. The combination in a slicing machine, of a slicing table with means for feeding an article to be sliced upon said table, a set of blades disposed through said table, crossheads on which said blades are mounted in spaced relation, and means for simultaneously oscillating said crossheads in arcuate paths, the curve of such paths facing oppositely relative to a vertical transverse plane through the slicing table.

36. The combination in a slicing machine, of a slicing table, a set of blades disposed through said table, crossheads on which said blades are mounted in spaced relation, and means for simultaneously oscillating said crossheads in oppositely facing arcuate paths.

37. The combination in a slicing machine, of an article feed means, sets of blades disposed in crossed relation, and means for simultaneously reciprocating and rocking said blades.

38. A bread slicing machine comprising side frames suitably united, upper and lower pivot shafts mounted in the side frames and extending transversely of the machine, rocker arms pivotally mounted on each of the pivot shafts, cutter bars mounted in the ends of the rocker arms and extending transversely of the machine, two sets of cutting blades, one set being attached to each pair of diagonally opposite cutter bars, a feed table, and means for reciprocating the upper and lower rocker arms simultaneously but in opposite directions.

39. A bread slicing machine comprising side frames, tie-rods uniting the side frames, a pair of upper and a pair of lower rocker arms pivotally mounted upon suitable supports between the side frames near the ends thereof, cutter bars mounted in the ends of the rocker arms and extending transversely of the machine, two sets of cutting blades, one set being attached to each pair of diagonally opposite cutter bars, a feed table, slots in the feed table through which the cutting blades extend and the sides of which form guides for the cutting blades, and means for reciprocating the upper and lower rocker arms simultaneously but in opposite directions.

40. A bread slicing machine comprising side frames suitably united, a plurality of upper rocker arms pivotally mounted between the side frames, a plurality of corresponding lower rocker arms pivotally mounted between the frames in alignment with the upper rocker arms, a pair of cutter bars mounted in the ends of the upper rocker arms, and extending transversely of the machine, similar cutter bars mounted in the ends of lower rocker arms, two sets of cutting blades, one set being united to each pair of diagonally opposite cutter bars, a feed table, slots in the feed table through which the cutting blades extend and the sides of which form guides for the cutting blades, and means for reciprocating the upper and lower rocker arms simultaneously.

41. A bread slicing machine comprising a frame, two horizontal pairs of rocker arms pivotally mounted on the frame, cutter bars mounted in the ends of the rocker arms and extending transversely of the machine, two sets of cutting blades, one set being secured to each pair of diagonally opposite cutter bars, and means for reciprocating the pairs of rocker arms simultaneously but in opposite directions.

CARL LITTLEFIELD.